United States Patent
Beals et al.

(10) Patent No.: US 9,736,436 B2
(45) Date of Patent: Aug. 15, 2017

(54) SYSTEMS AND METHODS FOR TRANSPONDER STACKING

(75) Inventors: William Michael Beals, Englewood, CO (US); Henry Gregg Martch, Parker, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 522 days.

(21) Appl. No.: 13/558,175

(22) Filed: Jul. 25, 2012

(65) Prior Publication Data

US 2014/0033258 A1  Jan. 30, 2014

(51) Int. Cl.
| | |
|---|---|
| H04N 21/2385 | (2011.01) |
| H04N 7/20 | (2006.01) |
| H04H 20/63 | (2008.01) |
| H04H 40/90 | (2008.01) |

(52) U.S. Cl.
CPC ............. *H04N 7/20* (2013.01); *H04H 20/63* (2013.01); *H04H 40/90* (2013.01); *H04N 21/2385* (2013.01)

(58) Field of Classification Search
CPC ...... H04N 21/2385; H04N 7/20; H04H 20/63; H04H 40/90
USPC .................................................... 725/63–72
See application file for complete search history.

(56) References Cited

U.S. PATENT DOCUMENTS

| | | | |
|---|---|---|---|
| 7,231,178 B2 * | 6/2007 | Friedman et al. .......... 455/12.1 |
| 7,477,871 B1 * | 1/2009 | Gurantz et al. ................. 725/71 |
| 7,792,486 B2 | 9/2010 | Petruzzelli | |
| 8,238,813 B1 * | 8/2012 | Popoli ............................ 725/63 |
| 8,266,333 B1 * | 9/2012 | Wade ................... H04N 19/436 710/14 |
| 2003/0179723 A1 * | 9/2003 | Novak et al. ................. 370/316 |
| 2004/0235415 A1 * | 11/2004 | Atarashi ...................... 455/3.02 |
| 2005/0005296 A1 * | 1/2005 | Bargroff et al. ................ 725/63 |
| 2005/0193419 A1 * | 9/2005 | Lindstrom et al. ............. 725/68 |
| 2006/0048197 A1 * | 3/2006 | Petruzzelli ...................... 725/38 |
| 2008/0178227 A1 * | 7/2008 | Petrovic et al. ................ 725/68 |

(Continued)

FOREIGN PATENT DOCUMENTS

| | | |
|---|---|---|
| JP | 2005-514830 A | 5/2005 |
| KR | 10-2005-0048334 A | 5/2005 |

(Continued)

OTHER PUBLICATIONS

International Search Report and Written Opinion, dated Nov. 12, 2013, for International Application No. PCT/US2013/052112, 9 pages.

*Primary Examiner* — Randy Flynn
(74) *Attorney, Agent, or Firm* — Seed IP Law Group LLP

(57) ABSTRACT

Systems and methods are disclosed for enabling each wideband tuner of a television converter device such as a set-top box to receive transponders from any satellite location and provide a unique feed per television converter device (e.g., per set-top box) input, giving each television converter device tuner its own set of six, eight or more transponders. The capacity of transponder stacking in the digital domain is extended to a system and method to make use of wideband tuner/demodulators. Each television converter device has a single wideband tuner/demodulator for six, eight or more transponders with each transponder being from any of all possible satellite locations. Bandwidth to each television converter device is thereby usefully increased.

21 Claims, 7 Drawing Sheets

(56) References Cited

U.S. PATENT DOCUMENTS

| | | | |
|---|---|---|---|
| 2008/0303739 A1* | 12/2008 | Sharon et al. | 343/876 |
| 2009/0290659 A1* | 11/2009 | Petrovic | H04H 20/63 375/340 |
| 2010/0023972 A1 | 1/2010 | Summers et al. | |
| 2010/0109928 A1 | 5/2010 | Chen | |
| 2010/0169938 A1 | 7/2010 | Nadarajah et al. | |

FOREIGN PATENT DOCUMENTS

| | | |
|---|---|---|
| TW | 353788 B | 12/2011 |
| TW | 354205 B | 12/2011 |
| TW | 355197 B | 12/2011 |

* cited by examiner

SYSTEMS AND METHODS FOR TRANSPONDER STACKING

TECHNICAL FIELD

The present disclosure generally relates to signals, and more particularly to communication of signals.

BRIEF SUMMARY

The term "transponder" is used herein to denote a particular carrier frequency or "sub-band" which can be tuned to by an appropriate tuner. In particular, note that "transponder" does not refer to a single program/content service (e.g., CNN®, HBO®, CSPAN®). Similarly, "tuning" herein refers to receiving a transponder (as previously defined) having multiple services thereon. A single satellite will typically have multiple transponders (e.g., 24 transponders), each transponder broadcasting or corresponding to a channel or band, for example, of approximately 24 to 27 MHz (0.024-0.027 GHz), or approximately 20 to 36 MHz (0.020-0.036 GHz) in some embodiments, in a broader frequency "band" of approximately 500 MHz. Thus, a band of 0.5 GHz may contain numerous transponders of roughly 24-27 MHz (or roughly 20 to 36 MHz in some embodiments) and each transponder in turn may carry a combined stream of digital data comprising a number of content services.

Transponder stacking refers to routing selected transponders to a group of assigned frequencies. In one example embodiment, a system and method use the capacity of routing selected transponders to a group of assigned frequencies in the digital domain to make use of wideband tuner/demodulators in television converter devices such as set-top boxes. This embodiment allows each wideband tuner to receive multiple transponders from any satellite location, greatly increasing useful payload into the set-top boxes. The system provides a unique feed per television converter device (e.g., per set-top box) input, giving each television converter device tuner its own set of six, eight or more transponders. Each television converter device then has a single wideband tuner/demodulator for six, eight or more transponders with each transponder being from any of all possible satellite locations and polarities. Bandwidth to each television converter device is thereby usefully increased.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
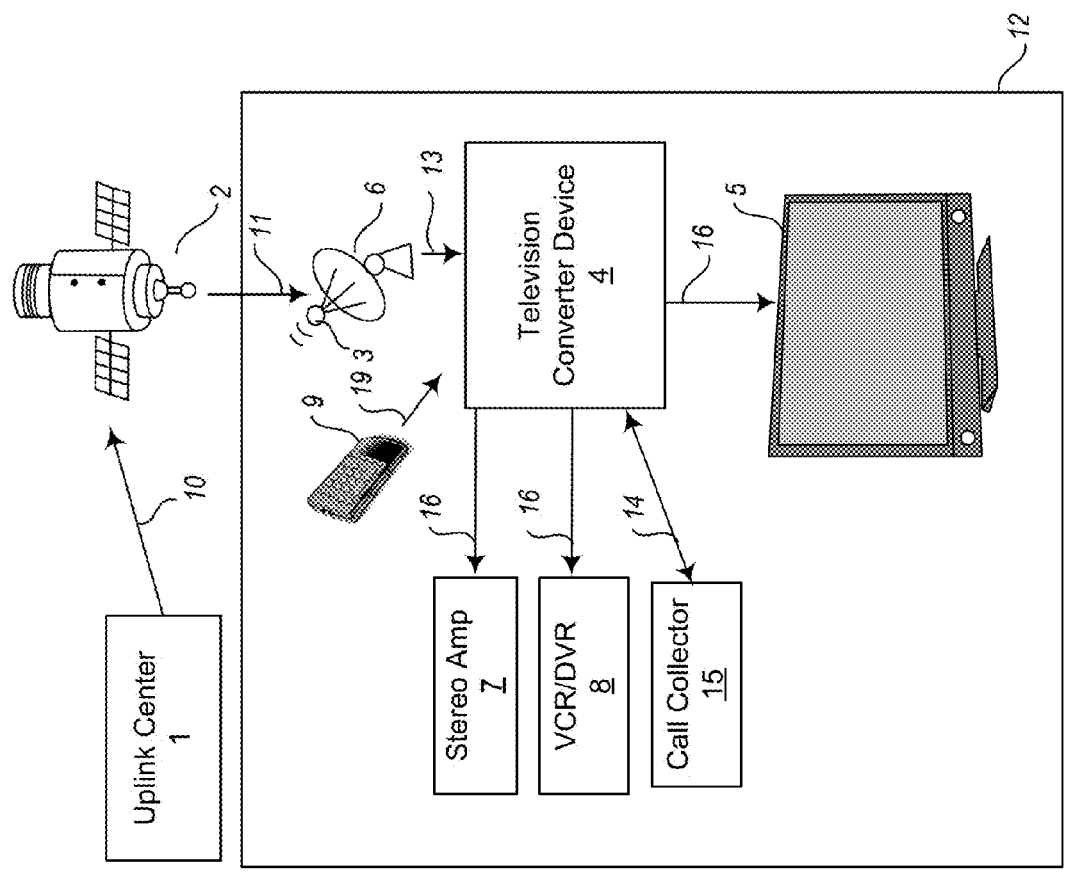
FIG. 1 is a block diagram of a satellite system, according to one non-limiting illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with receiving, processing, and outputting signals have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

The headings and Abstract of the Disclosure provided herein are for convenience only and do not interpret the scope or meaning of the embodiments.

The term "signal" may be any digital or analog signal. Those signals may include, but are not limited to, a bit, a specified set of bits, an AC signal, or a DC signal. Uses of the term "signal" in the description may include any of these different interpretations. It will also be understood to one skilled in the art that the term "connected" is not limited to a physical connection but can refer to any means of communicatively or operatively coupling two devices.

The disclosure uses the terms "television converter," "receiver," "set-top box," "television receiving device," "television receiver," "television recording device," "set-top box (STB)", "satellite set-top box," "satellite receiver," "cable set-top box," "cable receiver," and "television tuner" to refer interchangeably to a converter device or electronic equipment that has the capacity to acquire, process and distribute one or more signals transmitted by broadcast, cable, telephone or satellite distributors. DVR and "personal video recorder (PVR)" refer interchangeably to devices that can record and play back signals and that may implement trick functions including, but not limited to, fast-forward, rewind and pause. DVR and PVR functionality or devices may be combined with a television converter. The signals transmitted by these broadcast, cable, telephone or satellite distributors may include, individually or in any combination, internet, radio, television or telephonic data or information. One skilled in the art will recognize that a television converter device may be implemented as an external self-enclosed unit, a plurality of external self-enclosed units or as an internal unit housed within a television. One skilled in the art will recognize that the present invention can apply to analog and digital satellite set-top boxes.

The term "television" refers to a television set or video display that may contain an integrated television converter device (e.g., an internal cable-ready television tuner housed inside a television) or, alternatively, that is connected to an external television converter device (e.g., an external set-top box connected via cabling to a television).

As a general matter, it should also be understood that satellite signals may be very different from broadcast television or other types of signals. Satellite signals may include multiplexed, packetized, and modulated digital signals. Once multiplexed, packetized and modulated, one satellite transmission may carry digital data representing several television stations or service providers and may include many transponders. Some examples of service providers include HBO®, CSPAN®, ABC®, CBS®, or ESPN®.

FIG. 1 is a block diagram of a satellite system, according to one non-limiting illustrated embodiment.

The uplink center 1 of this example embodiment transmits a combined stream of audio/video/data (herein more simply termed the "video stream") on the uplink 10 to satellite 2. It should be noted that video streams for a plurality of services (e.g., CNN®, HBO®, CSPAN®) may be multiplexed onto a single uplink 10. In typical direct broadcast satellite (DBS) systems it is not uncommon to have six or more video streams multiplexed onto a single transponder. It should also be noted the transmissions between the uplink center 1, satellite 2 and dish 6 contain many transponders.

While transmissions to satellite 2 for purposes of satellite control may be made in another band such as the S-band (1.55-3 GHz), the uplink 10 used for the data uplink is most likely (but not necessarily) located within the broad K-band (10.9-36 GHz). Typically, the frequency range used is 17.3-17.8 GHz. DBS data streams are likely to be compressed in order to make maximum use of available bandwidth. More specifically, the MPEG-4 standard (e.g., H.264/MPEG-4 Part 10 or "Advanced Video Coding" (AVC)) for video compression is typically used to encode the video stream into time-sequential data. However, alternatively, one or more other standards of video encoding may also be used in various alternative embodiments (e.g., MPEG-2, H.263, VC-1, VC-2 (Dirac), Windows Media Video (WMV), Real-Video, Theora, TrueMotion VP3, etc.).

Satellite 2 may then translate the frequency of the signal for rebroadcast as a downlink 11. Satellite 2 may have a number of transponders, each having an assigned frequency sub-band that is typically used to downlink a transport stream. For example, for the downlink, the frequency band of downlink 11 may be located within 12.2-12.7 GHZ. Downlink 11 creates footprint 12 on the surface of the planet. A footprint 12 is that area in which the downlink 11 may be received clearly using inexpensive devices such as dish 6. The dish 6 is typically a parabolic dish having a diameter of roughly 18 to 36 inches and a generally circular or elliptical planiform shape. Dish 6 must be pointed properly if it is to receive the downlink signals. Mechanisms are available to assist in switching between satellites if more than one satellite feed is desired. Satellite 2 may broadcast multiple signals of differing polarity to dish 6, for example an LHCP signal (left hand circular polarity) and an RHCP signal (right hand circular polarity). Other polarities for broadcast signals are possible. As set forth in the one example embodiment, many bands of RF data may be transmitted on a single 0.5 GHz bandwidth.

Low-noise block downconverter feedhorn (LNBF) 3 typically then takes the signals concentrated by dish 6, separates both polarities of the signals and then processes them independently and simultaneously, translating the frequency of the signal to a lower frequency more suitable for transmission on coaxial cable 13 to television converter device 4. This lower frequency may, for example, be in the L-band (390 to 1550 MHz) or S-band (1.55 to 3.0 GHz). In this simplified embodiment, coaxial cable 13 may be the only connection between dish 6 and television converter device 4. The signals of downlink 11 and coaxial cable 13 are typically 8PSK or QPSK-encoded digital signals. However, this particular type of encoded signal is provided herein as one example embodiment and various other types of signals and encoding may be used instead.

Television converter device 4 typically tunes a transponder, demodulates the signal, demultiplexes out the desired service, decompresses it from MPEG-4 (e.g., from H.264/MPEG-4 Part 10 or "Advanced Video Coding" (AVC)) or other compression format (e.g., MPEG-2, H.263, VC-1, VC-2 (Dirac), Windows Media Video (WMV), RealVideo, Theora, TrueMotion VP3, etc.) and reformats it into the appropriate video specification (e.g., National Television Standards Committee (NTSC), Phase Alternate Lines (PAL), and High-Definition Multimedia Interface (HDMI), etc.). Television converter device 4 may then output the signal 16, as appropriate, to television 5, stereo amplifier 7, VCR/DVR 8 or other devices. Television converter device 4 may also interact with a call collector 15 via a signal 14 from a modem or other communications or networking device, for example to report pay-per-view purchases, and may also interact with remote control 9 via RF or IR signals 19.

The QPSK/8PSK modulated digital signal that arrives at the television converter device 4 may undergo extensive processing. The television converter device 4 may also include one or more tuner devices that may receive a satellite signal. In one embodiment, one tuner device may acquire one or more satellite signals. Each signal may represent a distinct frequency band or source. For example, one tuner device may receive the 950 MHz to 1450 MHz frequency band, while another tuner device may receive the 1650 MHz to 2150 MHz frequency band. These tuner devices of television converter device 4 may initially process the satellite signal and also receive subscriber commands in the form of signals originating from remote control 9. Signals originating from remote control 9 or those caused by signals originating from remote control 9 may include, but are not limited to, a signal to tune to a transponder as part of the process of selecting a certain program service for viewing on a peripheral device. Such tuners may include fewer, more, or different components. Also, television converter device 4 may perform other functions and be connected to fewer or more devices. One skilled in the art will recognize that many embodiments of television converter device 4 are possible and within the scope of this disclosure.

Figure 2:
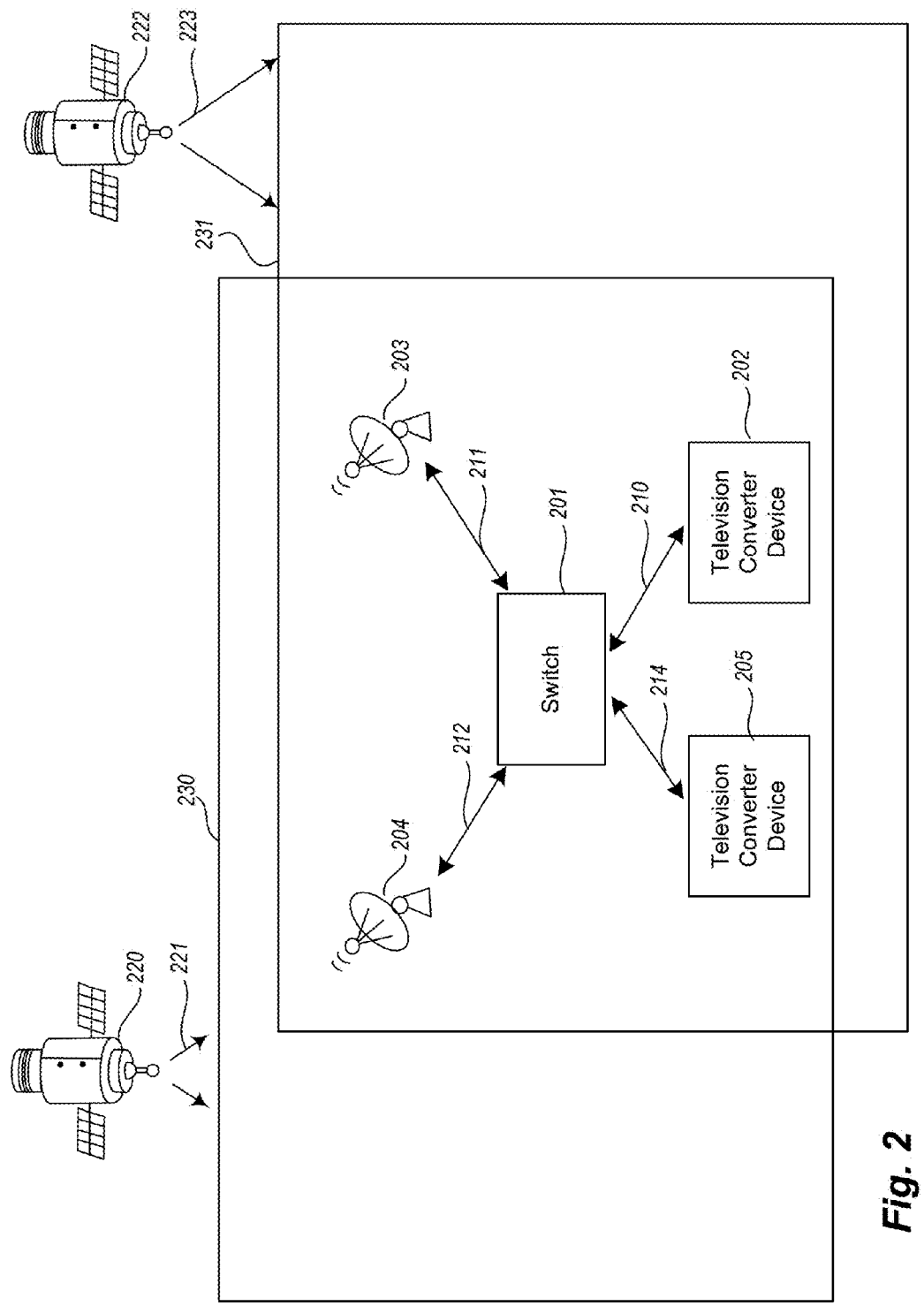
FIG. 2 is a block diagram of an example multi-satellite television system.

FIG. 2 is a block diagram of an example multi-satellite television system.

The multi-satellite television system of FIG. 2 may employ single and/or double tuner television converter devices in accordance with an example embodiment. Satellites 220 and 222 broadcast transport streams 221 and 223 into overlapping footprints 230 and 231. The signals of broadcast transport streams 221 and 223 are typically 8PSK or QPSK-encoded digital signals. However, in many embodiments, satellites 220 and 222 will provide different or substantially different programming services. Dishes/low-noise block downconverter feedhorns (LNBFs) 203 and 204 are each pointed and electronically configured so as to receive broadcasts from one each of satellites 220 and 222. The same result can be achieved using a single dish/multi-LNBF (not shown) configured so as to receive in one dish the signals of two or more satellites, or one dish with a two-feed LNBF, which is a more typical configuration. It should also be noted the transmissions between satellites 220 and 222 and LNBFs 203 and 204 contain many transponders.

Switch 201, a source selection switch, is used by the television converter devices 202 and 205 to switch between signals 211 and 212 provided by dish/LNBFs 203 and 204, respectively. The signals 211 and 212 are typically 8PSK or QPSK-encoded digital signals. Each of dish/LNBFs 203 and 204 function as the source of one orbital position programming service. For example, satellite 220 may be sending an extremely wide bandwidth of data. Switch 201 and the tuner(s) in television converter device 202 combine to select the appropriate transponder. Based upon, for example, DiSEqC 2.0 protocols received from the television converter device 205, switch 201 will select the appropriate satellite and band/polarization having the desired programming content contained within it. This signal is sent to the appropriate tuner of the television converter device 204 or 205, and the tuner of the television converter device 204 or 205 will select first the correct transponder and then the correct content service from among the services (typically 6-12) contained within the transponder.

In one example, switch 201 may be a transponder-stacked (16 transponder) switch between the Dishes/LNBFs 203 and 204 and the tuners of the television converter devices 205 and 202 to select which transponder to tune first. However, this transponder switching severely limits the usefulness of wideband tuners. Separately, traditional transponder stacking switches such as switch 201 exist to allow a single coaxial line (either 210 or 214) to simultaneously provide content/programming services selected from both Dishes/LNBFs 203 and 204 (such as those described in U.S. Pat. No. 7,792,486, which is incorporated by reference in its entirety), but are limited to sending the same transponder stacked signal to both the television converter devices 205 and 202. In order to address this issue, according to one embodiment, the system uses the capacity of transponder stacking in the digital domain to make use of wideband tuner/demodulators in television converter devices such as set-top boxes. The signals of coaxial lines 210 and 214 are typically 8PSK or QPSK-encoded digital signals. This embodiment allows each wideband tuner of the television converter devices to receive its own unique set of transponders from any satellite location and polarity, greatly increasing useful payload into the STBs (e.g., to each of the television converter devices 205 and 202).

Figure 3:
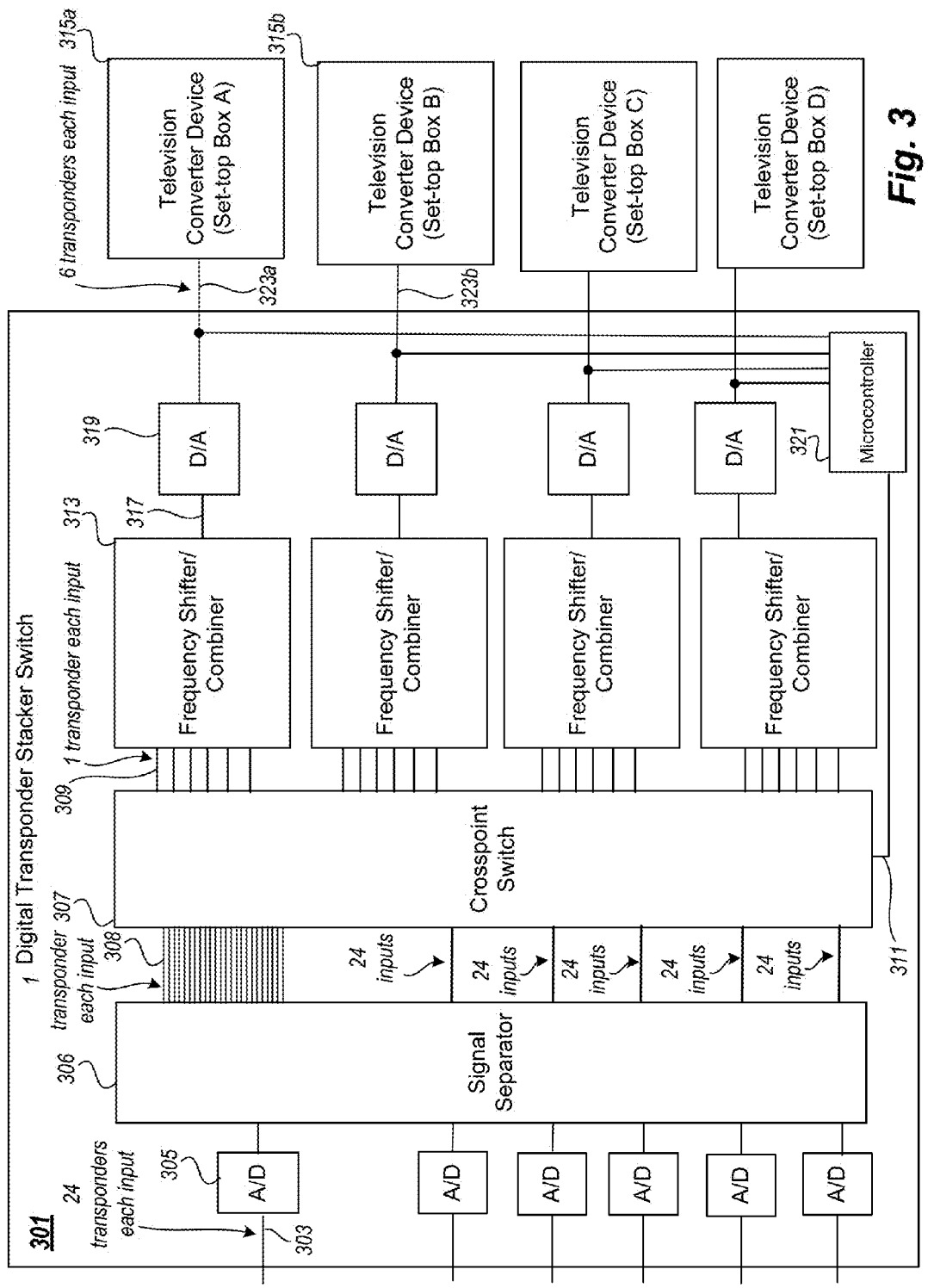
FIG. 3 is a block diagram of a digital transponder stacker switch, according to one non-limiting illustrated embodiment.

In particular, FIG. 3 is a block diagram of a digital transponder stacker switch 301, according to one non-limiting illustrated embodiment.

In the analog domain, increasing the size of the switching matrix goes up with the multiple of the number of inputs (N) and outputs (M) of the switch. For cost reasons, this severely limits the size of the switching matrix and its features. In the analog domain, when switching at the transponder level, the switched output is a shared resource as described above. However, in the digital domain, such as that of the digital transponder stacker switch 301 shown in FIG. 3, the cost issues are no longer this multiple. Using the digital transponder stacker switch 301 shown in FIG. 3, the costs are closer to N+M instead of N*M. Thus, there may be a unique feed per television converter device (e.g., STB) input, giving each television converter device tuner its own set of six, eight or more transponders, for example. It should also be noted that each television converter device receives transmissions that contain many transponders. Each television converter device then has a single wideband tuner/demodulator for six, eight or more transponders with each transponder being from any of all possible satellite locations. Bandwidth to each television converter device is thereby usefully increased.

The example digital transponder stacker switch 301 has a plurality of inputs 303 (only one called out) and specifically six inputs in the present example. However, the digital transponder stacker switch 301 may have fewer or more inputs in various other embodiments. In the present example, a signal consisting of 24 transponders is received at each input 303. However, the switch 301 may receive fewer or more transponders per input in various other embodiments as well. Each input 303 is connected to a respective analog to digital (A/D) converter 305 (only one called out), which converts the signal received on the respective input 303 to a converted signal representing the signal received on the respective input 303.

The output of each A/D converter 305 is connected to a respective input of a signal separator 306. The signal separator 306 separates the signal output of each A/D converter 305 (which includes 24 transponders in the present example) into separate signals for each transponder. Thus, in the present example, the signal separator 306 has 144 outputs each providing a signal corresponding to a different one of the transponders included in the signals output from the A/D converters. Each of the outputs of the signal separator 306 is connected to a corresponding input 308 (only one called out) of a digital crosspoint switch 307. For example, a signal corresponding to one of the 24 transponders included in the signal output from the A/D converter 305 is provided to input 308 of the digital crosspoint switch 307 via the signal separator 306. Thus, in the present example, there are 144 inputs to the digital crosspoint switch 307 each providing a signal corresponding to a different one of the transponders included in the signals output from the A/D converters. The first group of 24 inputs to the digital crosspoint switch 307 (which includes example input 308) are shown individually in FIG. 3. However, five lines, with each line representing 24 inputs to the digital crosspoint switch 307, are shown for the other five groups of 24 inputs to improve drawing legibility.

The digital crosspoint switch 307 is configured to digitally route any individual transponder received at any input 308 of the digital crosspoint switch 307 to any individual output 309 (only one called out) of the digital crosspoint switch 307 according to a signal received at a selection signal input 311 to the digital crosspoint switch 307. Different sets of outputs 309 of the digital crosspoint switch 307 are connected to different individual frequency shifter/combiners 313 (only one called out) at respective inputs of the respective frequency shifter/combiner 313. For example, a set of six outputs (including output 309) from digital crosspoint switch 307 is connected to six respective inputs of frequency shifter/combiner 313.

In the present example shown in FIG. 3, there are four frequency shifter/combiners, each having a different respective set of six outputs from digital crosspoint switch 307 connected to six respective inputs of the respective frequency shifter/combiner 313. However, there may be fewer or more frequency shifter/combiners in various other embodiments and each frequency shifter/combiner 313 may be configured to receive as input fewer or more outputs (e.g., eight instead of six) from the digital crosspoint switch 307.

For example, in one embodiment such as that shown in FIG. 3, the digital transponder stacker switch 301 has six inputs 303, with each input 303 to the digital transponder stacker switch 301 configured to receive a signal including 24 transponders. Thus, in the present example, a total of 144 (6×24) outputs 309 (only 24 shown in FIG. 3) from the digital crosspoint switch are each configured to output any selected one of the 144 transponders according to the signal received at a selection signal input 311 to the digital crosspoint switch 307. Therefore, in the present example, a total of 24 frequency shifter/combiners 313 may be connected to the digital crosspoint switch 307, with each frequency shifter/combiner 313 connected to a set of six respective outputs of the digital crosspoint switch 307. This therefore enables each frequency shifter/combiner 313 to receive as input any combination of six transponders of the total 144 transponders output from the digital crosspoint switch 307. However, as mentioned above, each frequency shifter/combiner 313 may be configured to receive as input fewer or more outputs (e.g., eight instead of six) from the digital crosspoint switch 307 and thus receive as input any combination of fewer or more transponders (e.g., eight instead of six) of the total 144 transponders output from the digital crosspoint switch 307.

Each digital frequency shifter/combiner 313 transponder stacks the six transponders received at each respective input in a frequency band within which each respective television converter device 315a and 315b (only two called out) can find the desired programming as indicated by the selection input signal received at the selection signal input 311. In particular, in the present example, the output 317 (only one called out) of each frequency shifter/combiner 313 provides a digital signal representing the six stacked transponders received at the respective six inputs 309 of the respective frequency shifter/combiner 313.

Each output 317 of each frequency shifter/combiner 313 is connected to a respective digital to analog (D/A) converter 319 (only one called out). Each D/A converter 319 is configured to be connected, for example, via cable (e.g., co-axial) or wirelessly to respective inputs 323a and 323b of the respective television converter devices 315a and 315b. Each D/A converter 319 is configured to convert the signal representing the six stacked transponders output from the respective frequency shifter/combiner 313 to a signal formatted to be operably received by the respective connected television converter devices 315a and 315b. In particular, the signals received on respective inputs 323a and 323b of the respective television converter devices 315a and 315b are typically 8PSK or QPSK-encoded digital signals.

Each television converter device 315a and 315b may then have a single wideband tuner/demodulator for six transponders (or fewer or more transponders in other embodiments) with each transponder being from any of all possible satellite locations. Thus, as discussed above, bandwidth to each television converter device 315a and 315b is thereby usefully increased.

The selection signal received at the selection signal input 311 to the digital crosspoint switch 307 is output by a microcontroller 321 of the digital transponder stacker switch 301. The microcontroller 321 is connected to each of the television converter devices 315a and 315b, for example, via cable (e.g., co-axial) or a wireless connection and is configured to receive a plurality of selection signals from the television converter devices 315a and 315b. In various embodiments, the connection(s) between the microcontroller and the respective television converter devices 315a and 315b may be over the same or different medium (e.g., same or different cable or wireless connection) as the connection between each D/A converter 319 and each respective television converter device 315a and 315b. The microcontroller 321 is configured to communicate (and also interpret, translate and/or reformat, as necessary) the selection signals (e.g., content service selection) from each of the respective television converter devices 315a and 315b to the digital crosspoint switch 301 such that the digital crosspoint switch 301 may select the appropriate individual transponder to output at the appropriate individual digital crosspoint switch output 309. However, the functions of the microcontroller 321 could be implemented in discrete logic with no central processing unit (CPU) or software involvement. In one embodiment, a discrete logic circuit may be coupled to the selection input 311 and discrete logic circuit is configured to be coupled to selection outputs of the plurality of television converter devices 315 which are configured to receive different signals that each include any combination of transponders according to the selection input signal.

In this manner, the digital transponder stacker switch may provide each television converter device 315a and 315b with its own particular combination of six transponders of the total number of transponders received from various satellites at any of the digital stacker switch inputs 303.

Figure 4:
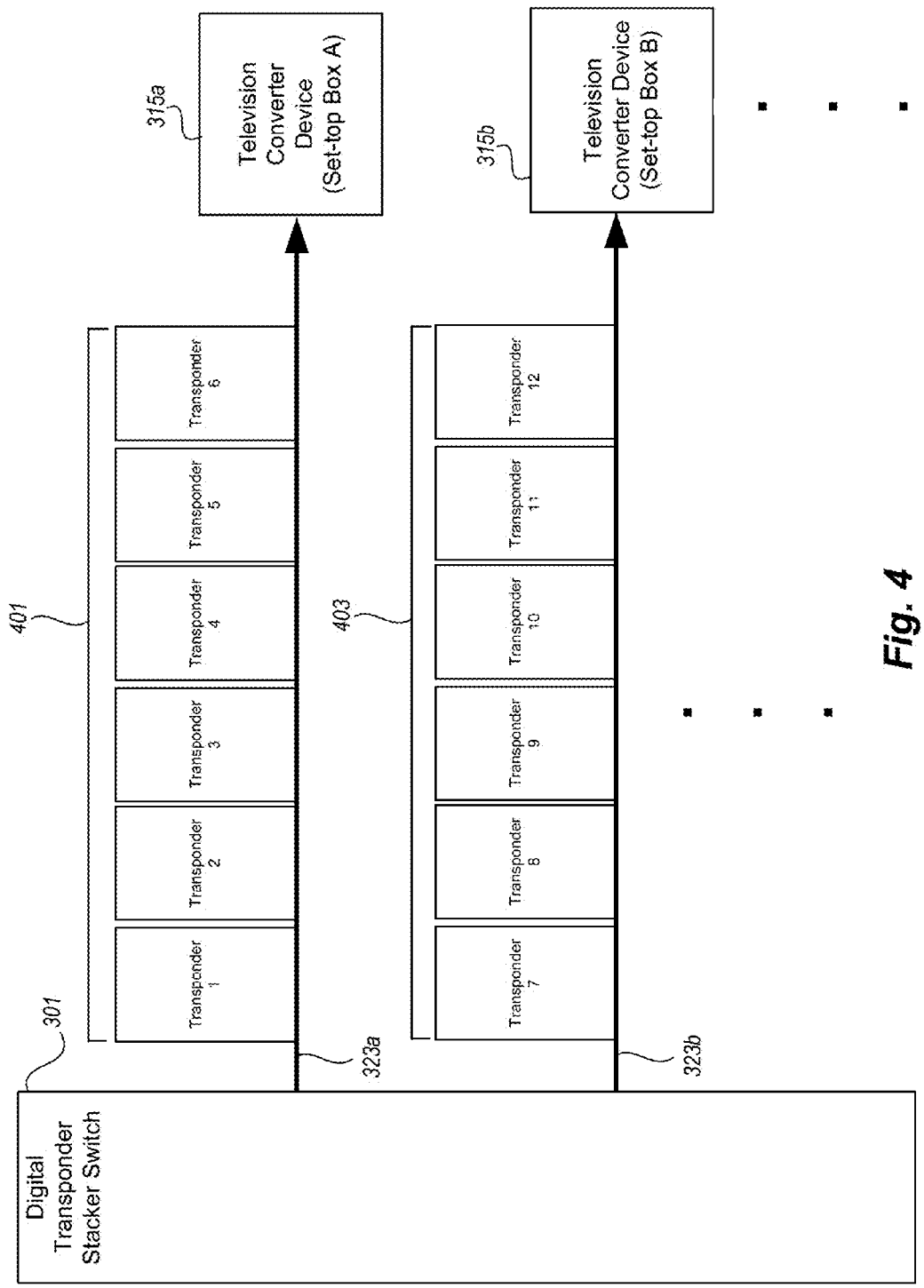
FIG. 4 is a block diagram of the digital transponder stacker switch of FIG. 3 connected to a plurality of television converter devices, according to one non-limiting illustrated embodiment.

FIG. 4 is a block diagram of the digital transponder stacker switch 301 of FIG. 3 connected to the plurality of television converter devices 315a and 315b (only two called out), according to one non-limiting illustrated embodiment.

In particular, shown are the outputs 323a and 323b from the digital transponder stacker switch 301 connected to the two example respective television converter devices 315a and 315b. The signal communicated on output 323a to respective television converter device 315a includes a first combination 401 of six transponders (transponders 1 through 6) of the total number of transponders received from various satellites at any of the digital stacker switch inputs 303 shown in FIG. 3. However, the signal communicated on output 323b to respective television converter device 315b includes a second combination 403 of six transponders (transponders 6 through 12) of the total number of transponders received from various satellites at any of the digital stacker switch inputs 303 shown in FIG. 3. A given transponder received from any satellite at any of the digital stacker switch inputs 303 may appear not only in multiple different switch outputs 323 of the digital transponder stacker switch 301, but could even be duplicated by the digital transponder stacker switch 301 for a given switch output. For example, this may be controlled by or in response to selection signal received at the selection signal input 311 to the digital crosspoint switch 307. As also discussed above, each television converter device 315a and 315b may then have a single wideband tuner/demodulator for six transponders (or fewer or more transponders in other embodiments) with each transponder being from any of all possible satellite locations.

Thus, the digital stacker switch 301 is configured to be able to digitally route different unique combinations of transponders received by the digital stacker switch 301 individually to different corresponding connected television converter devices. Although there are only shown two example connected television converter devices 315a and 315b in FIG. 4, there may be more television converter devices in various other embodiments.

In various embodiments, the digital stacker switch 301 may be operably combined, connected to, or be part of a low-noise block downconverter (LNB) or LNBF, including, but not limited to, various types of LNBs and LNBFs that are configured to deliver signals to any number of television converter devices and tuners. Such devices may include, but are not limited to, quattro LNBs, dual/twin/quad/octo LNBs, SCR or Unicable LNBs, optical-fibre LNBs, monoblock LNBs, duo LNBs, etc.

Figure 5:
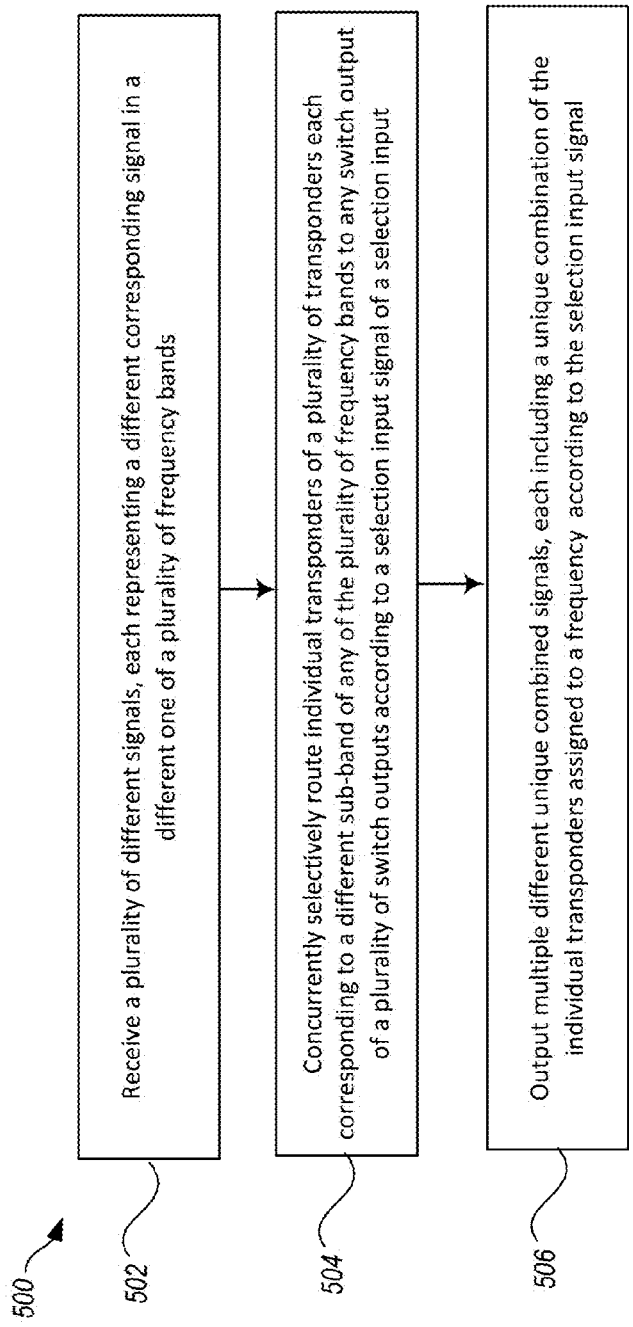
FIG. 5 is a flow diagram showing a digital switching method for signals operating in the digital transponder stacker switch of FIG. 3, according to one non-limiting illustrated embodiment.

FIG. 5 is a flow diagram showing a digital switching method 500 for signals operating in the digital transponder stacker switch 301 of FIG. 3, according to one non-limiting illustrated embodiment.

At 502, the digital transponder stacker switch 301 receives a plurality of different signals, each representing a different corresponding signal in a different one of a plurality of frequency bands.

At 504, the digital transponder stacker switch 301 concurrently selectively routes individual transponders of a plurality of transponders each corresponding to a different sub-band of any of the plurality of frequency bands to any switch output of a plurality of switch outputs according to a selection input signal of a selection input.

At 506, the digital transponder stacker switch 301 outputs multiple different unique combined signals, each including a unique combination of the individual transponders assigned to a frequency according to the selection input signal.

Figure 6:
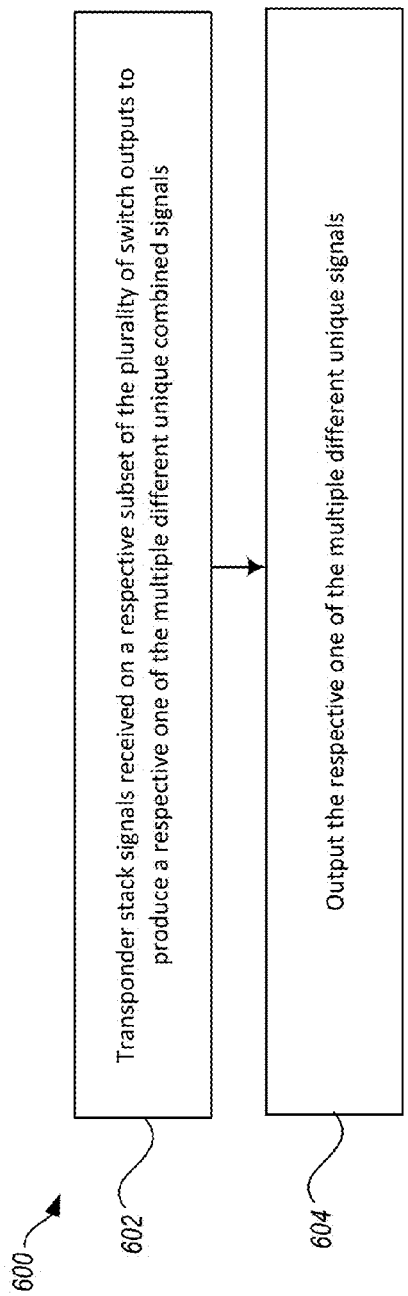
FIG. 6 is a flow diagram showing a transponder stacking method for signals operating in the digital transponder stacker switch of FIG. 3 useful in the method of FIG. 5, according to one non-limiting illustrated embodiment.

FIG. 6 is a flow diagram showing a transponder stacking method 600 for signals operating in the digital transponder stacker switch 301 of FIG. 3 useful in the method of FIG. 5, according to one non-limiting illustrated embodiment.

At 602, the digital transponder stacker switch 301 transponder stacks signals received on a respective subset of the plurality of switch outputs to produce a respective one of the multiple different unique combined signals.

At 604, the digital transponder stacker switch 301 outputs the respective one of the multiple different unique signals. In the present example embodiment, the digital transponder stacker switch 301 performs this operation for each respective subset of the plurality of digital crosspoint switch outputs of the digital transponder stacker switch 301.

Figure 7:
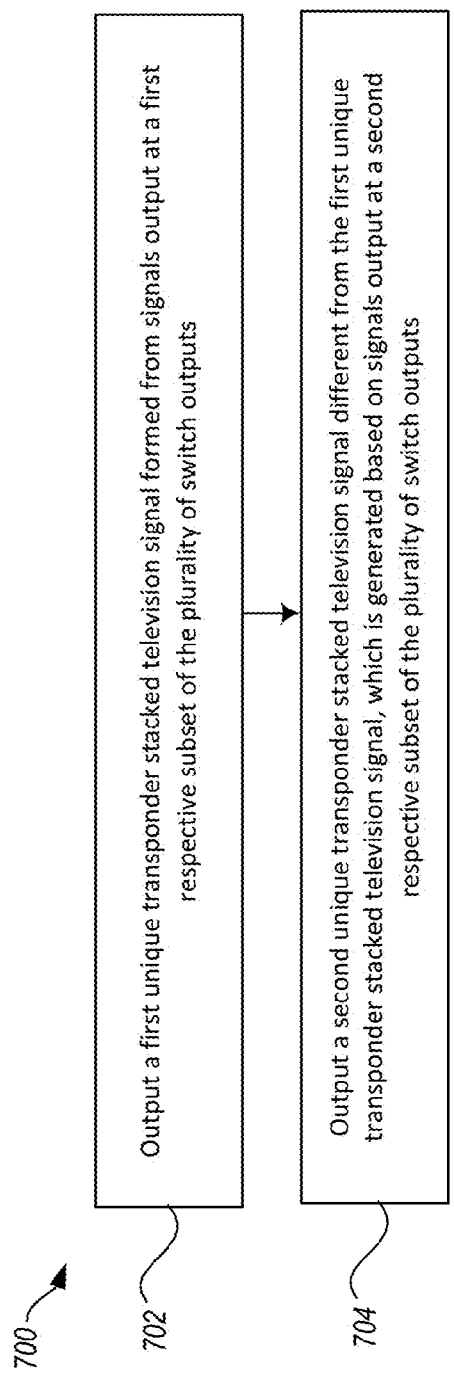
FIG. 7 is a flow diagram showing a method for providing different transponder stacked signals operating in the digital transponder stacker switch of FIG. 3 useful in the method of FIG. 5, according to one non-limiting illustrated embodiment.

FIG. 7 is a flow diagram showing a method 700 for providing different transponder stacked signals operating in the digital transponder stacker switch 301 of FIG. 3 useful in the method of FIG. 5, according to one non-limiting illustrated embodiment.

At 702, the digital transponder stacker switch 301 outputs a first unique transponder stacked signal formed from signals output at a first respective subset of the plurality of switch outputs.

At 704, the digital transponder stacker switch 301 outputs a second unique transponder stacked signal different from the first unique transponder stacked signal, which is generated based on signals output at a second respective subset of the plurality of switch outputs. The second unique transponder stacked signal is generated based on signals output at a second respective subset of the plurality of switch outputs. In the present example embodiment, the digital transponder stacker switch 301 performs this operation for each respective subset of the plurality of switch outputs.

The various methods described herein may include additional acts, omit some acts, and/or may perform the acts in a different order than set out in the various flow diagrams.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that many functions and/or operations within such block diagrams (e.g., the function of the microcontroller 321), flowcharts, or examples can be implemented, individually and/or collectively, by a wide range of hardware, software, firmware, or virtually any combination thereof and that designing the circuitry and/or writing the code for the software and/or firmware would be well within the skill of one of ordinary skill in the art in light of the teachings of this disclosure. For example, the functions of the microcontroller 321 could be implemented in discrete logic with no central processing unit (CPU) or software involvement. In one embodiment, a discrete logic circuit may be coupled to the selection input 311. The discrete logic circuit is configured to be coupled to selection outputs of the plurality of television converter devices 315 which are configured to receive different signals that each include any combination of transponders according to the selection input signal. As another example, the functions of the signal separator 306, crosspoint switch 309, and frequency shifter/combiner can be physically implemented in many ways, including discrete hardware, DSP software, or any other methods capable of performing such functions.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system (e.g., the microcontroller 321), apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. Aspects of the embodiments can be modified, if necessary, to employ systems, circuits and concepts of the various patents, applications and publications to provide yet further embodiments.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. An integrated switch with transponder stacking, comprising:
   a digital crosspoint switch comprising:
      a plurality of switch inputs configured to receive a plurality of different signals;
      a selection input; and
      a plurality of switch outputs, wherein each signal of the plurality of different signals represents a different corresponding signal in a different one of a plurality of frequency bands, and wherein the digital crosspoint switch is configured to concurrently selectively route individual transponders of a plurality of transponders each corresponding to different sub-bands of any of the plurality of frequency bands to any of the plurality of switch outputs according to a selection input signal of the selection input; and
   a plurality of transponder stacker circuits coupled to the plurality of switch outputs, each transponder stacker circuit of the plurality of transponder stacker circuits coupled to a respective subset of the plurality of switch outputs, wherein the respective subset of the plurality of switch outputs contains at least six switch outputs, each of the at least six switch outputs corresponding to an individually selected transponder for the switch output according to the selection input signal and wherein at least one transponder stacker circuit of the plurality of transponder stacker circuits receives signals corresponding to different satellites on the respective subset of the plurality of switch outputs of the digital crosspoint switch, and each transponder stacker circuit configured to transponder stack signals received on the respective subset of the plurality of switch outputs to enable each transponder stacker circuit to be able to output a respective different unique combined signal, each respective unique combined signal including a unique combination of the individual transponders of the plurality of transponders according to the selection input signal, and to enable duplicate transponders between each unique combination of the individual transponders, the unique combination of transponders of the plurality of transponders including transponders corresponding to different satellites.

2. The integrated switch with transponder stacking of claim 1 wherein each of the sub-bands corresponds to a transponder of approximately 20 to 36 MHz.

3. The integrated switch with transponder stacking of claim 1 wherein each of the plurality of frequency bands is approximately 500 MHz.

4. The integrated switch with transponder stacking of claim 1 wherein each of the plurality of switch inputs is configured to receive a different signal corresponding to a different satellite.

5. The integrated switch with transponder stacking of claim 1 wherein each of the plurality of switch inputs is configured to receive a different signal representing a different group of transponders of the plurality of transponders.

6. The integrated switch with transponder stacking of claim 5 wherein each of the plurality of transponders are approximately 20 to 36 MHz.

7. The integrated switch with transponder stacking of claim 5 wherein each of the plurality of transponders carries a combined stream of data comprising a number of content services.

8. The integrated switch with transponder stacking of claim 5 wherein the plurality of transponder stacker circuits contains at least four transponder stacking circuits.

9. The integrated switch with transponder stacking of claim 1 wherein each of the transponder stacker circuits is configured to transponder stack the signals received on the respective subset of the plurality of switch outputs by performing frequency shifting and combining of the signals received on the respective subset of the plurality of switch outputs.

10. The integrated switch with transponder stacking of claim 1 further comprising:
    the selection input coupled to the digital crosspoint switch; and
    a discrete logic circuit coupled to the selection input, wherein the discrete logic circuit is configured to be coupled to selection outputs of a plurality of television converter devices which are configured to receive different signals that each include any combination of signals from any of the sub-bands of any of the plurality of frequency bands according to the selection input signal.

11. The integrated switch with transponder stacking of claim 1 further comprising:
    the selection input coupled to the digital crosspoint switch; and
    a microcontroller coupled to the selection input, wherein the microcontroller is configured to be coupled to selection outputs of a plurality of television converter devices which are configured to receive different signals that each include any combination of signals from any of the sub-bands of any of the plurality of frequency bands according to the selection input signal.

12. The integrated switch with transponder stacking of claim 1 wherein the plurality of switch inputs includes at least 144 inputs, each corresponding to a respective transponder and the plurality of switch outputs includes at least 144 outputs, each of the plurality of switch outputs configured to output any selected one of the 144 respective transponders corresponding to the switch inputs according to the selection input signal.

13. The integrated switch with transponder stacking of claim 1 further comprising:
    a plurality of digital to analog converters, each digital to analog converter coupled to a respective one of each of the plurality of transponder stacker circuits, wherein each digital to analog converter is configured to:
       be connected to a respective converter device; and convert a respective unique combined signal output by the respective transponder stacker circuit including transponders corresponding to different satellites to a signal formatted to be operably received by the respective converter device.

14. The integrated switch with transponder stacking of claim 1 wherein the selection input signal is based on input received from a plurality of television converter devices and each transponder stacker circuit of the plurality of transponder stacker circuits coupled to the respective subset of the plurality of switch outputs converts the signals corresponding to different satellites on the respective subset of the plurality of switch outputs of the digital crosspoint switch into one frequency band within which each of the plurality of television converter devices can find desired programming as indicated by the selection input signal that is based on input received from a plurality of television converter devices.

15. A method comprising:
receiving a plurality of different signals, each representing a different corresponding signal in a different one of a plurality of frequency bands;
digitally concurrently selectively routing individual transponders of a plurality of transponders each corresponding to a different sub-band of any of the plurality of frequency bands to any switch output of a plurality of switch outputs according to a selection input signal of a selection input, wherein the digitally concurrently selectively routing includes at least one transponder stacker circuit of a plurality of transponder stacker circuits receiving signals corresponding to different satellites on a respective subset of a plurality of switch outputs of a digital crosspoint switch input to the transponder stacker circuit, wherein the respective subset of the plurality of switch outputs contains at least six switch outputs, each of the at least six switch outputs corresponding to an individually selected transponder for the switch output according to the selection input signal;
outputting multiple different unique combined signals, each respective different unique combined signal including a unique combination of the individual transponders assigned to a specific frequency according to the selection input signal, wherein at least two of the multiple different unique combined signals include duplicate transponders between unique combinations of the individual transponders of the at least at least two of the multiple different unique combined signals, and wherein the outputting multiple different unique combined signals includes transponder stacking signals received on a respective subset of the plurality of switch outputs to produce a respective one of the multiple different unique combined signals, the transponder stacking including at least one respective transponder stacker circuit of a plurality of transponder stacker circuits receiving signals corresponding to different satellites on the respective subset of a plurality of switch outputs.

16. The method of claim 15 wherein each of the sub-bands corresponds to a transponder of approximately 20 to 36 MHz.

17. The method of claim 15 wherein each of the plurality of frequency bands is approximately 500 MHz.

18. The method of claim 15 wherein each signal of the plurality of different signals represents a different corresponding signal originating from a different satellite.

19. The method of claim 15 wherein each signal of the plurality of different signals represents a different group of transponders of the plurality of transponders.

20. The method of claim 15 wherein each of the plurality of transponders are approximately 20 to 36 MHz.

21. The method of claim 20 wherein each of the plurality of transponders carries a combined stream of data comprising a number of content services.

* * * * *